Dec. 9, 1941.    R. G. CARLSON    2,265,595
VALVE
Filed July 24, 1939
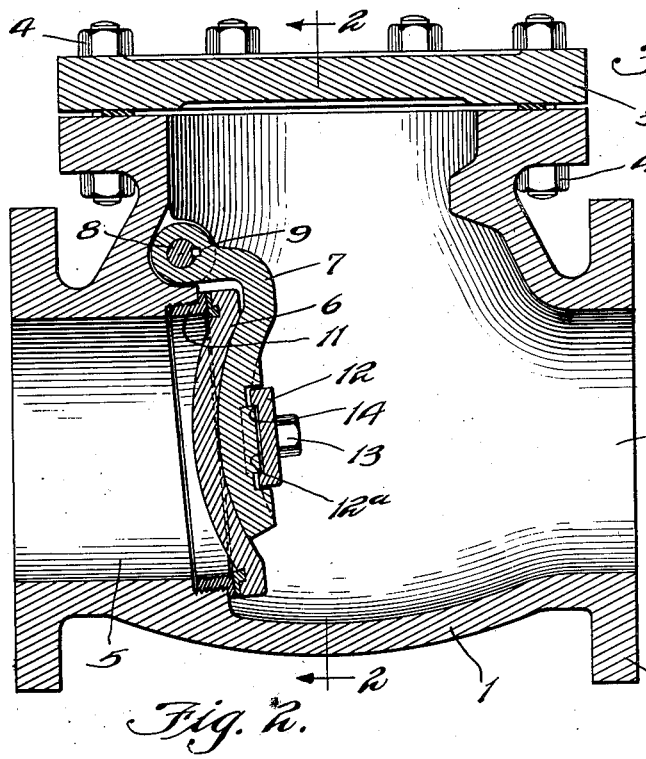
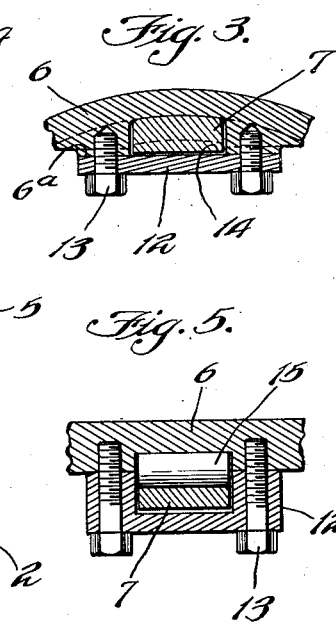
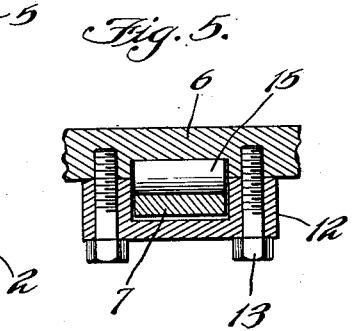
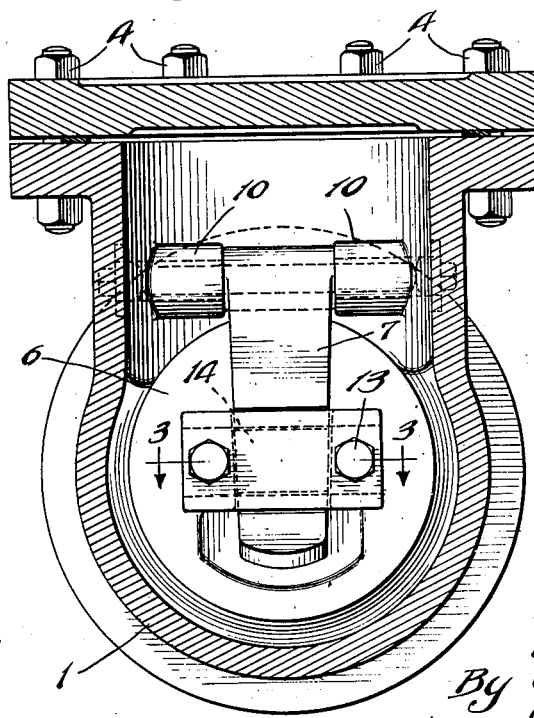
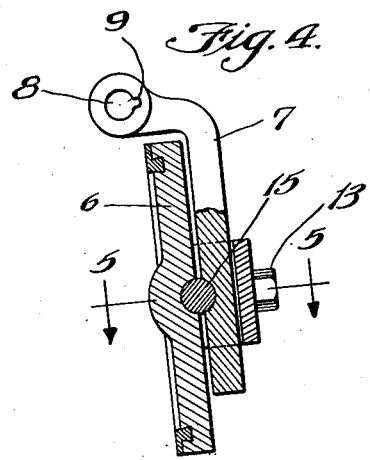
Inventor
Ralph G. Carlson
By Joseph O. Lange, Atty.

Patented Dec. 9, 1941

2,265,595

UNITED STATES PATENT OFFICE 2,265,595

VALVE

Ralph G. Carlson, Chicago, Ill., assignor to Crane Co., Chicago, Ill., a corporation of Illinois Application July 24, 1939, Serial No. 286,111

5 Claims. (Cl. 251—123)

This invention relates to valves and particularly to the type of valves more commonly described as swing check valves.

Heretofore it has been common knowledge that one of the objectionable features usually present in the operation of the conventional swing check valves has been the tendency for the valve, upon seating with occurrence of backflow within the pipe line, to pound or to chatter and eventually, depending upon the extent of such pounding, to cause the closure member to seat improperly due to the damage done to the hinge pin or the hinge, and in many cases actually deface the valve seat or closure member before the cause could be detected and remedied. In further explanation, to those skilled in the art, it is accepted that upon the occurrence of backflow or with a drop in line pressure the force which draws the valve to its seat may frequently be very substantial, creating a slamming or pounding which places objectionable strain upon such valve elements as the hinge pin, the hinge, and the closure member, without adequate relief therefor.

Therefore, it is one of the principal objects of my invention to provide a swing check valve in which a transverse reinforcing member either integral therewith or separately is used to provide a better distribution of such operating strains so as to avoid distortion and breakage of the parts involved. More particularly, a holding member cooperating with the usual clapper hinge member functions to provide a predetermined amount of clearance in the clapper or closure member to create smooth and substantially trouble-free operation.

Another important object lies in providing a more uniform distribution of stress loads in contradistinction to concentrating, as heretofore, on a certain part or parts which ultimately resulted in valve failure.

Another important object is to provide a closure member or clapper which is not revolvable upon the longitudinal axis of its connection with the usual hinge member but preferably is pivotable so as to prevent the usual turning and looseness which eventually leads to valve failure.

Other objects and advantages will become more readily apparent upon proceeding with the specification in connection with the drawing, in which Fig. 1 is a sectional assembly view showing one embodiment of a closure member in a valve employing my invention.

Fig. 2 is a sectional view taken on the line 2—2 of Fig. 1.

Fig. 3 is a fragmentary sectional view taken on the line 3—3 of Fig. 2.

Fig. 4 is a partial sectional view of the disc and hinge in assembly with a further modification employing the principle of my invention.

Fig. 5 is a fragmentary sectional view taken on the line 5—5 of Fig. 4.

Like numerals refer to like parts in the various views.

Referring now to Fig. 1, the valve consists of the usual body or casing 1 provided with the end flanges or other suitable connections 2 for attachment to a pipeline, the valve preferably having the bolted cap 3 held in leak-proof relation to the casing 1 by means of the bolts 4. Transversely extending across the ports 5 is the pivotally disposed closure member 6 which is attached, as at the hinge 7, to the pin 8 preferably held in non-rotatable relation to the said hinge by means of the square key 9. As more clearly shown in Fig. 2, the pin 8 is journally supported within the opposite disposed integral bosses 10 of the casing 1. The closure member 6 seats upon the seat ring 11 forming the usual seal therefor. The seat ring 11 obviously may be made integral with the casing rather than as a separate unit, as shown.

Attention is now directed to the attachment between the hinge 7 and the closure member 6 in which construction the principle of my invention lies. More specifically, it will be noted that a holding member 12 is fixedly attached to the closure member 6 by means of the bolts 13 the latter providing an abutting contact as at 6a (see Fig. 3). A projecting portion 14 upon the hinge 7, as more clearly shown in Fig. 2, engages the hollow or grooved section 12a of the holder 12 and the hinge 7, the general plan or contour being more clearly shown by the dotted lines of Fig. 2. The projecting portion 14 thus serves the following functions: first, as between the hinge and the closure member the projecting portion allows for sufficient clearance so that when the load is suddenly placed upon the hinge in being seated such load is transmitted to its plane surface and thereby distributes the load over a larger area rather than to concentrate it upon the hinge itself; secondly, the projecting portion serves as a means in cooperation with the bolts 13 to prevent the rotation of the closure member 6. Further, it will be apparent that the extension 14 may be of special material such as rubber, steel, iron, etc., or a particular material having extreme hardness under certain conditions of pressures and temperatures or it may be made of combination of materials capable of withstanding the service and shock. Of course, the selection of the material for this member largely depends upon the kind of service to which the valve is subjected. Therefore, should it become damaged or defective, due to repeated operation, the matter of replacement is simple and economical.

Directing attention to the modified form illustrated in Fig. 4, in this modification instead of using a flat or plane extension 14 between the hinge 7 and the holding member 12, the said extension is dispensed with and a roller or cylindrical pin 15 is used to carry the load produced by slamming the valve during the course of service. The cylindrical pin 15 fits snugly in the hollow grooves, respectively at 6b and 7a, upon the closure member 6 and the hinge 7 with a predetermined clearance therebetween. Thus the impact during the course of operation instead of being transmitted to a flat or plane surface will be transmitted to the circumferential surface as provided by the pin roller member 15.

It will be obvious to those who are skilled in the art that the detailed form of the portions 14 and 15, respectively, may change considerably, depending on the type of valve used and the service for which it is recommended. The closure member likewise may be changed in its form and this is equally true of the type of hinge used.

Accordingly, the scope of this invention should be measured by the terms of the claims appended hereto and not by the particular illustrations used to describe the application of preferred forms of my invention.

I claim:

1. In a swing check valve comprising a casing, a hinge, a closure member attached to the hinge, a member insertable between the closure member and the hinge, the said insertable member being rotatable within hollow recesses provided respectively by the said hinge and closure members, whereby the closure member is pivotable transversely to its axis of attachment but is held against substantial endwise movement.

2. In a swing check valve comprising a casing, a hinge, a closure member attached to the hinge, a cylindrical bearing pin loosely positioned parallel to the pivotal axis of the hinge and between the closure member and the hinge whereby the closure member is held nonrotatable about an axis transverse to the axis of rotation of the hinge but rotatable about an axis parallel to the said axis of rotation.

3. In a swing check valve comprising a casing, a pivotal hinge, a closure member attached to the hinge, an elongated insertable member extending substantially parallel to the pivotal hinge axis and between the closure member and the hinge whereby the seating load may be transmitted directly to the insertable member, the said hinge and closure members having complementary recessed portions within which the said insertable member is nested to permit limited pivotal movement therebetween independently of the pivotal movement permitted by the hinge.

4. In a swing check valve comprising a casing, a hinge, a closure member attached to the hinge, a renewable cylindrical member positioned between the closure member and the hinge whereby the impact in seating the closure member is substantially carried by the said cylindrical member, the means of attachment between the said hinge and closure members being formed to provide for limited transverse movement of the said cylindrical member whereby the latter member serves as a key to prevent substantial relative endwise movement between the said hinge and closure members.

5. In a swing check valve comprising a casing, a hinge, a closure member attached to the hinge, substantially cylindrical means extending in a direction parallel to the pivotal axis of the said hinge and insertable between the said closure member and hinge whereby the seating load is transmitted directly to the insertable means and the said closure member, the means of attachment for the said closure member to the hinge including a holder, the latter member being shouldered against an upper surface of the said closure member, the said holder providing for predetermined clearance between the said cylindrical means and the said hinge to permit relative pivotal movement of the closure member in the same direction as the pivotal movement of the said hinge.

RALPH G. CARLSON.